United States Patent [19]
Toda

[11] Patent Number: 6,026,178
[45] Date of Patent: Feb. 15, 2000

[54] IMAGE PROCESSING APPARATUS USING NEURAL NETWORK

[75] Inventor: Yukari Toda, Yokohama, Japan

[73] Assignee: Canon Kabushiki Kaisha, Tokyo, Japan

[21] Appl. No.: 08/708,741

[22] Filed: Sep. 5, 1996

[30] Foreign Application Priority Data

Sep. 8, 1995 [JP] Japan ................................ 7-231269

[51] Int. Cl.$^7$ ................................ G06T 1/40; G06T 5/20
[52] U.S. Cl. .................... 382/158; 382/274; 258/461; 706/22; 706/31
[58] Field of Search ..................... 382/156, 157, 382/158, 159, 161, 237, 232, 274, 254, 173, 176, 275, 270; 358/429, 534, 536, 455, 456, 461; 706/26, 27, 31, 15, 16, 22

[56] References Cited

U.S. PATENT DOCUMENTS

| | | | |
|---|---|---|---|
| 5,168,352 | 12/1992 | Naka et al. | 358/81 |
| 5,271,068 | 12/1993 | Ueda et al. | 382/30 |
| 5,309,525 | 5/1994 | Shimomura et al. | 382/50 |
| 5,495,542 | 2/1996 | Shimomura et al. | 382/254 |
| 5,719,955 | 2/1998 | Mita | 382/158 |

OTHER PUBLICATIONS

K. Sivakumar & U.B. Desai, Image Restoration using a Multilayer Perceptron with a Multlevel Sigmoidal Function, IEEE transactions on Signal Processing, May 1993, pp. 2018–2022.

Ali Tabatabai, A neural Net Based Architecture for the Segmentation of Mixed Gray–Level a Binary Pictures, IEEE Transactions on Circuits & Systems, Jan. 1991, pp. 66–77.

Tai–Wen Yue & Guo–Tai Chen, An Auto–Invertible neural network for image halftoning & Restroation, IEEE, 1995.

*Primary Examiner*—Leo H. Boudreau
*Assistant Examiner*—Brian P. Werner
*Attorney, Agent, or Firm*—Fitzpatrick, Cella, Harper & Scinto

[57] ABSTRACT

In order to realize a neural network for image processing by an inexpensive hardware arrangement, a neural network arranged in an image processing apparatus is constituted by an input layer having neurons for receiving information from picture elements in a 7×7 area including an interesting picture element in an image, an intermediate layer having one neuron connected to all the 49 neurons in the input layer and five groups of nine neurons, the nine neurons in each group being connected to nine neurons in the input layer, which receive information from picture elements in at least one of five 3×3 areas (1a to 1e), and an output layer having one neuron, which is connected to all the neurons in the intermediate layer and outputs information corresponding to the interesting picture element.

4 Claims, 8 Drawing Sheets

THRESHOLD FUNCTION

SIGMOID FUNCTION

FIG.10A
PRIOR ART

| 1 | 1 | 1 |
|---|---|---|
| 1 | 1 | 1 |
| 1 | 1 | 1 |

FIG.10B
PRIOR ART

| 1 | 2 | 3 | 2 | 1 |
|---|---|---|---|---|
| 2 | 4 | 6 | 4 | 2 |
| 3 | 6 | 9 | 6 | 3 |
| 2 | 4 | 6 | 4 | 2 |
| 1 | 2 | 3 | 2 | 1 |

IMAGE PROCESSING APPARATUS USING NEURAL NETWORK

BACKGROUND OF THE INVENTION

1. Field of the Invention

The present invention relates to an image processing apparatus using a neural network and, more particularly, to an image processing apparatus which performs image binary-to-multi-value conversion for restoring original multi-value image data from binary image data obtained by eliminating information of the multi-value image data, area discrimination processing for discriminating whether an area of a certain image is a halftone area or a character area, and the like.

2. Related Background Art

As a conventional method of estimating an original multi-value image on the basis of a binary image obtained by binarizing the multi-value image, a method using a smoothing filter shown in FIGS. 10A and 10B, or a method using a hierarchical neural network is used.

However, the smoothing filter cannot simultaneously and satisfactorily convert a halftone area and a character area into multi-value data. For example, when a small window shown in FIG. 10A is used, a character area can be satisfactorily converted into multi-value data, but granularity remains in a halftone area. On the other hand, when a large window shown in FIG. 10B is used, a halftone area can be satisfactorily converted into multi-value data, but a character area is blurred.

In the method using a neural network, as the number of pieces of input information increases, multi-value conversion can be attained more satisfactorily, and the above-mentioned drawbacks of the smoothing filter can be compensated for. However, in a conventional neural network, neurons of an input layer are connected to those of an intermediate layer, and neurons of the intermediate layer are connected to those of an output layer. Hence, owing to processing in each neuron based on this coupled state, a huge calculation amount is required, and if such processing is realized in a software manner, a considerably long period of time is required. For example, multi-value conversion of an image having 256×256 picture elements (or pixels) and 3 colors requires about 12 minutes when it is realized by a neural network having 49 neurons in an input layer, 25 neurons in an intermediate layer, and 11 neurons in an output layer. For this reason, demand has arisen for a hardware arrangement of a neural network. However, currently announced neuro chips are very expensive and are not practical.

SUMMARY OF THE INVENTION

It is, therefore, an object of the present invention to provide an image processing apparatus using a neural network, which is realized by an inexpensive hardware arrangement.

It is another object of the present invention to provide an image processing apparatus which can satisfactorily execute high-speed image processing using a neural network realized by a hardware arrangement.

According to one aspect, the present invention which achieves these objects relates to an image processing apparatus comprising a neural network, the neural network comprising an input layer having neurons for receiving information of picture elements in a first area including an interesting picture element in an image, an intermediate layer having at least one neuron connected to all the neurons in the input layer and a plurality of neurons connected to the neurons in the input layer, which receive information of picture elements in at least one of a plurality of second areas included in the first area, and an output layer having at least one neuron which is connected to all the neurons in the intermediate layer and outputs information corresponding to the interesting picture element.

Other objectives and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIGS. 10A and 10B are views showing examples of a smoothing filter.

DETAILED DESCRIPTION OF THE PREFERRED EMBODIMENTS

One preferred embodiment of the present invention will be described in detail hereinafter with reference to the accompanying drawings.

Prior to the description of the arrangement of a neural network of this embodiment, the outline of a neural network will be briefly explained.

A neural network is a network that simulates human neurons, and individual constituting elements of the network have functions similar to human neurons. These elements are called neurons. The neurons are connected to each other, and a pattern recognition function can be buried in the neural network by appropriately determining the operations of the neurons and the connection pattern among the neurons.

The neural network is roughly classified into two types, i.e., a hierarchical network and an interconnection network. A network used for restoring a multi-value image from a binary image is the former, hierarchical network, and is characterized in that the connection pattern (weight coefficients) is adjusted by learning. An algorithm for the learning is called back propagation.

[Structure of Neuron]

Figure 7:
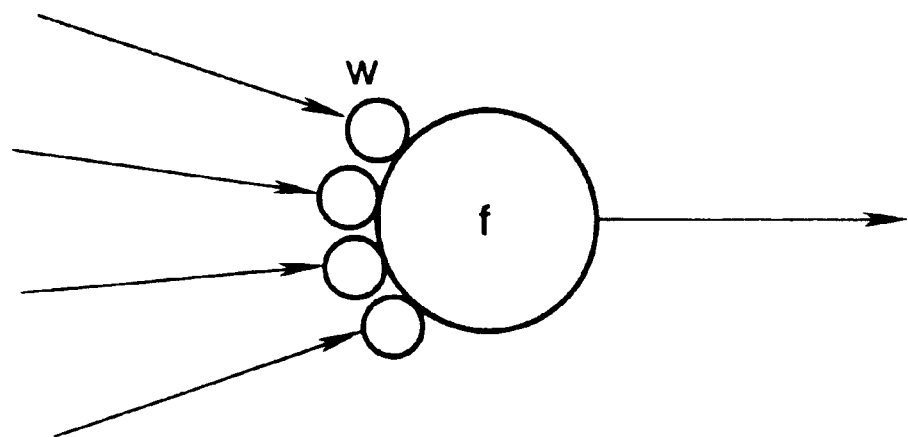
FIG. 7 is a view showing the structure of a neuron.

FIG. 7 shows the structure of a neuron. A neuron has a simple structure, i.e., is constituted by a portion for receiving inputs from other neurons while multiplying them with weights, a portion for converting an input signal in accordance with a predetermined rule, and a portion for outputting the conversion result. Weights indicate coupling strengths with other neurons. A weight coefficient=0 indicates the absence of coupling. In a learning process, the weight coefficients are variable, but become constants and never change after an output error has converged and the learning has ended.

A neuron receives, as an input value, a product sum of signals input[i] and weights w[i] from a plurality of neurons i (i×0, 1, . . . , n). If "sum" represents this input value, sum is given by:

$$\text{sum} = \sum_{i=0}^{n} (\text{input}[i] * w[i]) \quad (1)$$

n: the number of connections

Figure 8A:
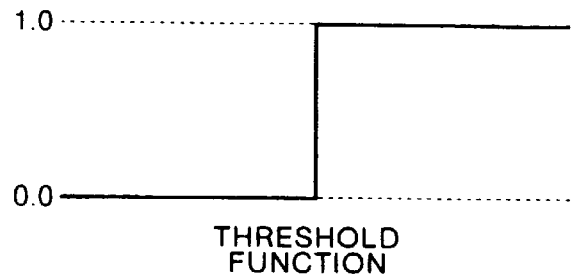
FIGS. 8A and 8B are charts showing examples of the input/output functions of a neuron.
Figure 8B:
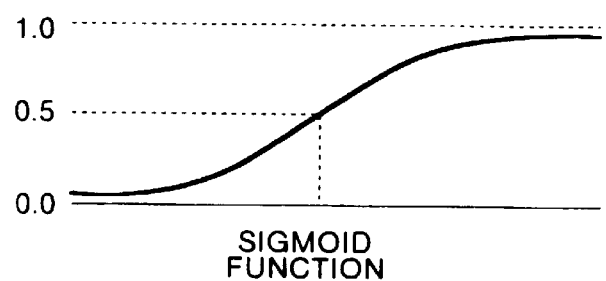

Each neuron applies a function f to sum so as to convert it. This function f normally uses a threshold function shown in FIG. 8A or a sigmoid function shown in FIG. 8B. In this simulation, the sigmoid function shown in FIG. 8B was used. The sigmoid function is a differential pseudo-function, and is given by:

$$f(X) = \frac{1}{1 + e^{-x}} \quad (2)$$

This function outputs a value ranging from 0 to 1.

[Hierarchical Network]

Figure 9:
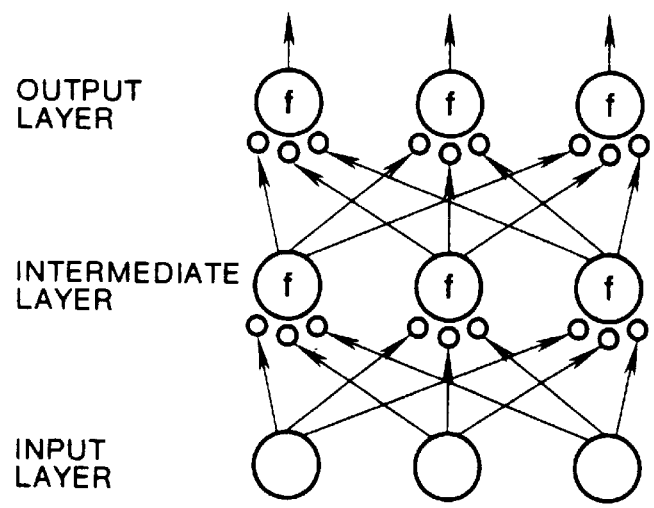
FIG. 9 is a diagram showing the arrangement of a hierarchical neural network.

FIG. 9 shows an example of the arrangement of a hierarchical network.

The number of neurons in an input layer, which only receives input signals, matches that of input vectors, and the number of neurons in an output layer is required in correspondence with the number of classes to be classified. The number of intermediate layers and the number of neurons in each intermediate layer are not particularly limited in principle, and the intermediate layers may be omitted. The learning is made in the following steps.

(1) Initial values are assigned using random numbers to all weight coefficients between the input layer and the intermediate layer and between the intermediate layer and the output layer.

(2) An input pattern and a corresponding ideal output are prepared.

(3) The input pattern is input to neurons in the input layer, and an output is calculated in accordance with the network arrangement.

(4) An error between the calculated output and the ideal output is calculated.

(5) Correction amounts of the weight coefficients are calculated based on the error, and the weight coefficients are updated.

(6) Steps (2) to (5) are repeated until the error converges.

The weight coefficients obtained via the above-mentioned steps become final constants.

[Network Arrangement]

Figure 1:
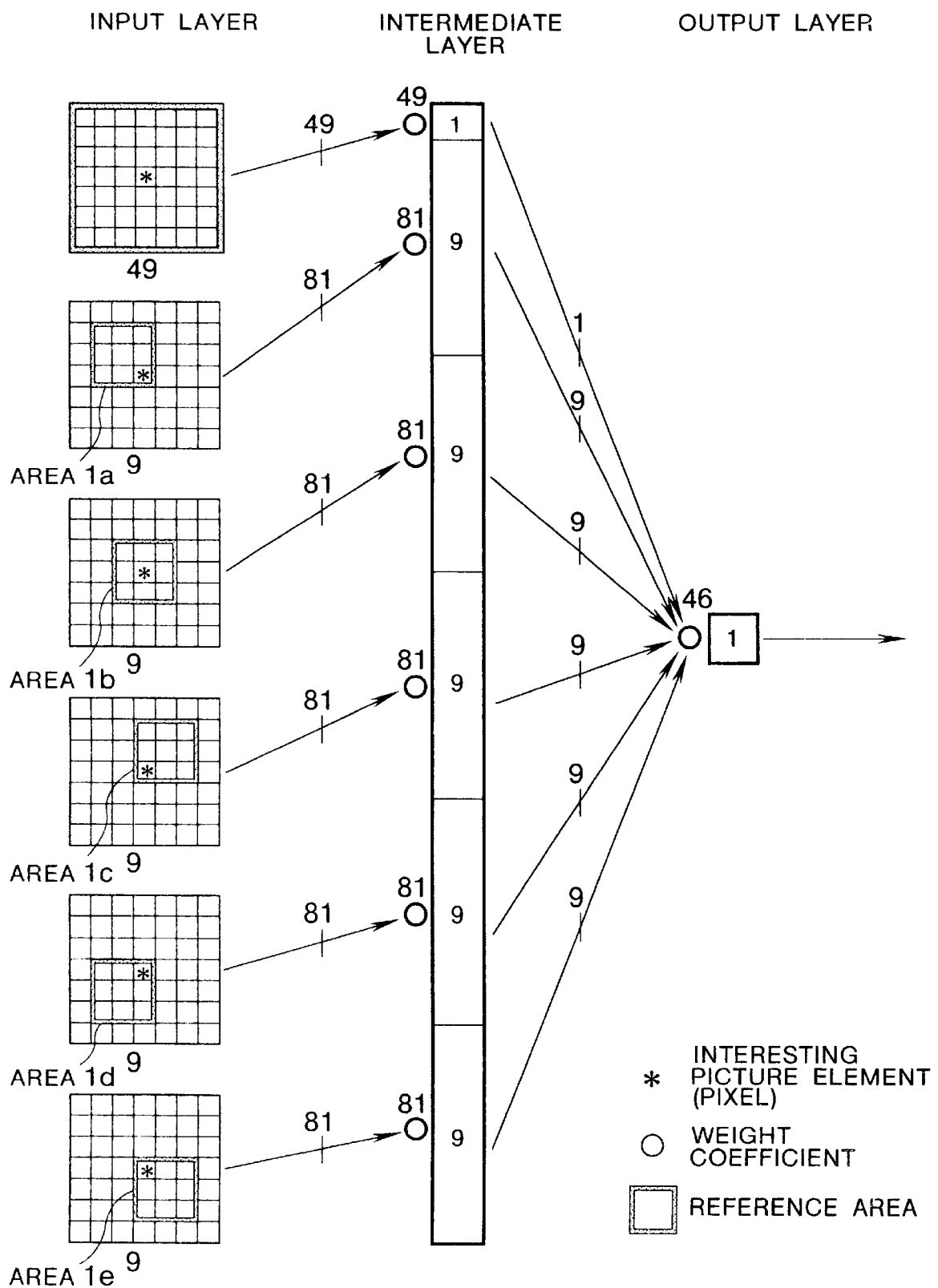
FIG. 1 is a diagram showing the network arrangement of an image processing apparatus according to an embodiment of the present invention.
Figure 3:
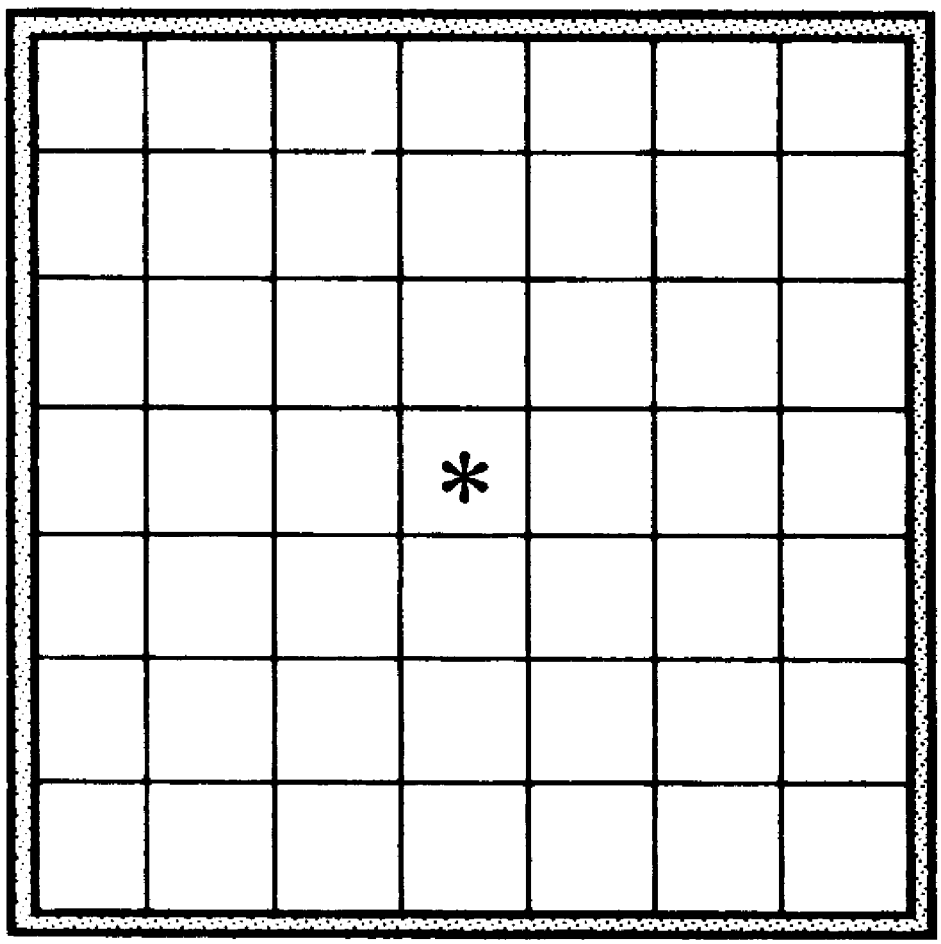
FIG. 3 is a view showing the arrangement of a reference window.

FIG. 1 shows the network structure when a 7×7 window shown in FIG. 3 is arranged. Since picture elements in the 7×7 window having an interesting picture element as the center are used as input values, the number of neurons in the input layer is 49 in correspondence with the number of picture elements. Five 3×3 small areas 1a to 1e each including the interesting picture element are formed in the 7×7 window, and the structure will be explained in view of the intermediate layer. Note that numerals in the intermediate layer indicate the numbers of neurons. The first neuron in the intermediate layer is coupled to neurons (i.e., all the neurons) in the input layer corresponding to the picture elements included in the 7×7 area. The next nine neurons are coupled to nine neurons in the input layer corresponding to picture elements included in the first small area 1a. The next nine neurons are coupled to nine neurons in the input layer corresponding to picture elements included in the second small area 1b. Likewise, nine neurons in the intermediate layer are coupled to neurons in the input layer corresponding to picture elements included in each of the third, fourth, and fifth small areas (1c, 1d, 1e), and as a result, a total number of neurons in the intermediate layer is 46 (=1+9×5). All the neurons in the intermediate layer are connected to a neuron in the output layer. In FIG. 1, connection lines and weight coefficients are represented in bundles in units of groups, a numeral marked at each connection line indicates the number of bundled lines, and a numeral above each blank circle indicates the number of weight coefficients. For example, the number of connection lines between nine neurons in the input layer corresponding to picture elements in the small area 1a and nine neurons in the intermediate layer connected thereto is 81 (=9×9) since all the neurons are connected to each other, and the number of weight coefficients is also 81.

[Hardware Arrangement]

The above-mentioned structure is equivalent to a network which includes 49 neurons in the input layer, 46 neurons in the intermediate layer, and one neuron in the output layer, and in which some connection lines are omitted (their weight coefficients are zero). Since some connection lines are omitted not randomly but regularly, the following neurons and weight coefficients can be considered as one set:

(1) nine neurons in the input layer corresponding to each small area;

(2) nine neurons in the intermediate layer connected thereto; and (3) nine weight coefficients between the nine neurons in the intermediate layer and the neuron in the output layer.

Figure 4:
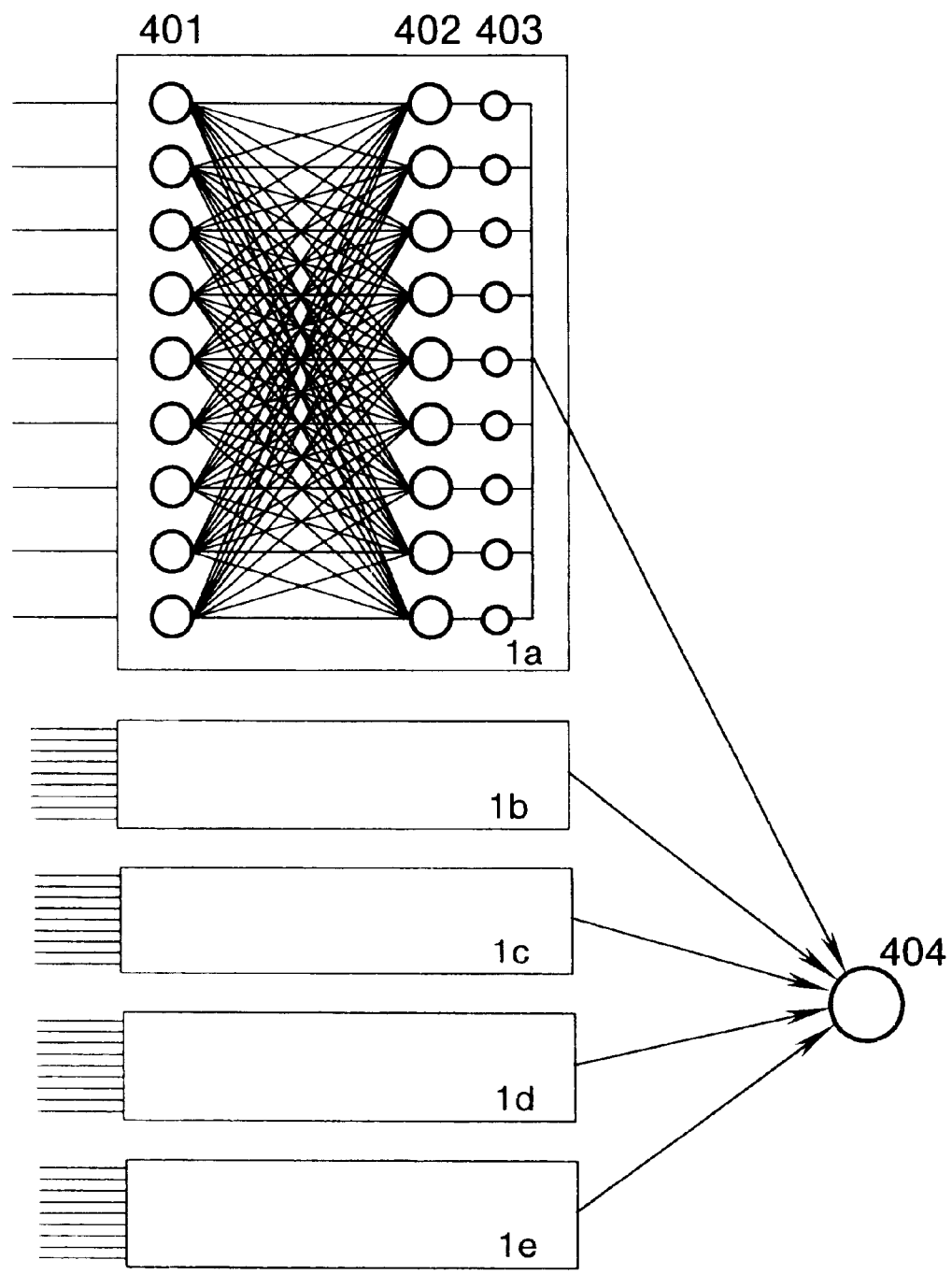
FIG. 4 is a block diagram showing the hardware arrangement for a set of a small area.

Since one set can be considered as a black box that generates one output based on nine inputs, it can be replaced by a 9-bit look-up table. FIG. 4 shows the states of five black boxes 1a to 1e. Neurons 401 are those in the input layer corresponding to picture elements in the small area 1a, and the areas 1a to 1e include overlapping neurons. Neurons 402 are nine neurons in the intermediate layer, which are connected to the neurons 401. Coefficients 403 are nine weight coefficients between the nine neurons 402 in the intermediate layer and a neuron 404 in the output layer. The neurons 401 and 402 are all coupled to each other, and the neuron 404 receives a product-sum value of the outputs from the neurons 402 and the corresponding weight coefficients 403.

Figure 5:
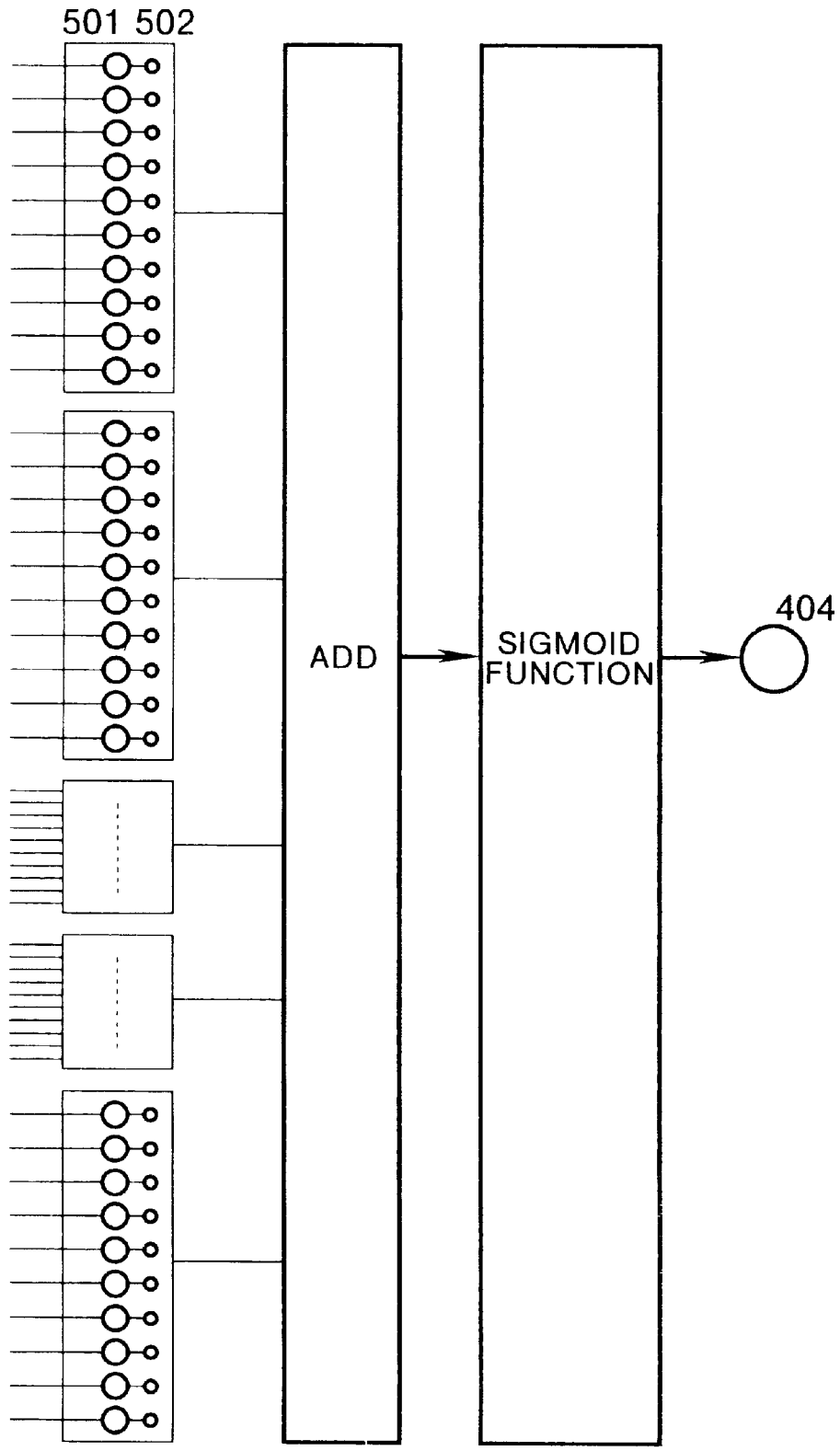
FIG. 5 is a block diagram showing the hardware arrangement of neurons in an intermediate layer, which are coupled to all the neurons in an input layer.

On the other hand, the first neuron in the intermediate layer receives information from all the 49 neurons in the input layer. This neuron can also be replaced by a look-up table if pairs of 49 connection lines and weight coefficients are divided into five groups, i.e., 10+10+10+10+9. FIG. 5 shows the arrangement of this neuron.

Neurons 501 are 49 neurons in the input layer, and symbol 502 indicates weight coefficients between the neurons in the input layer and the first neuron in the intermediate layer.

Furthermore, assume that the sigmoid function is also processed using a look-up table.

Figure 2:
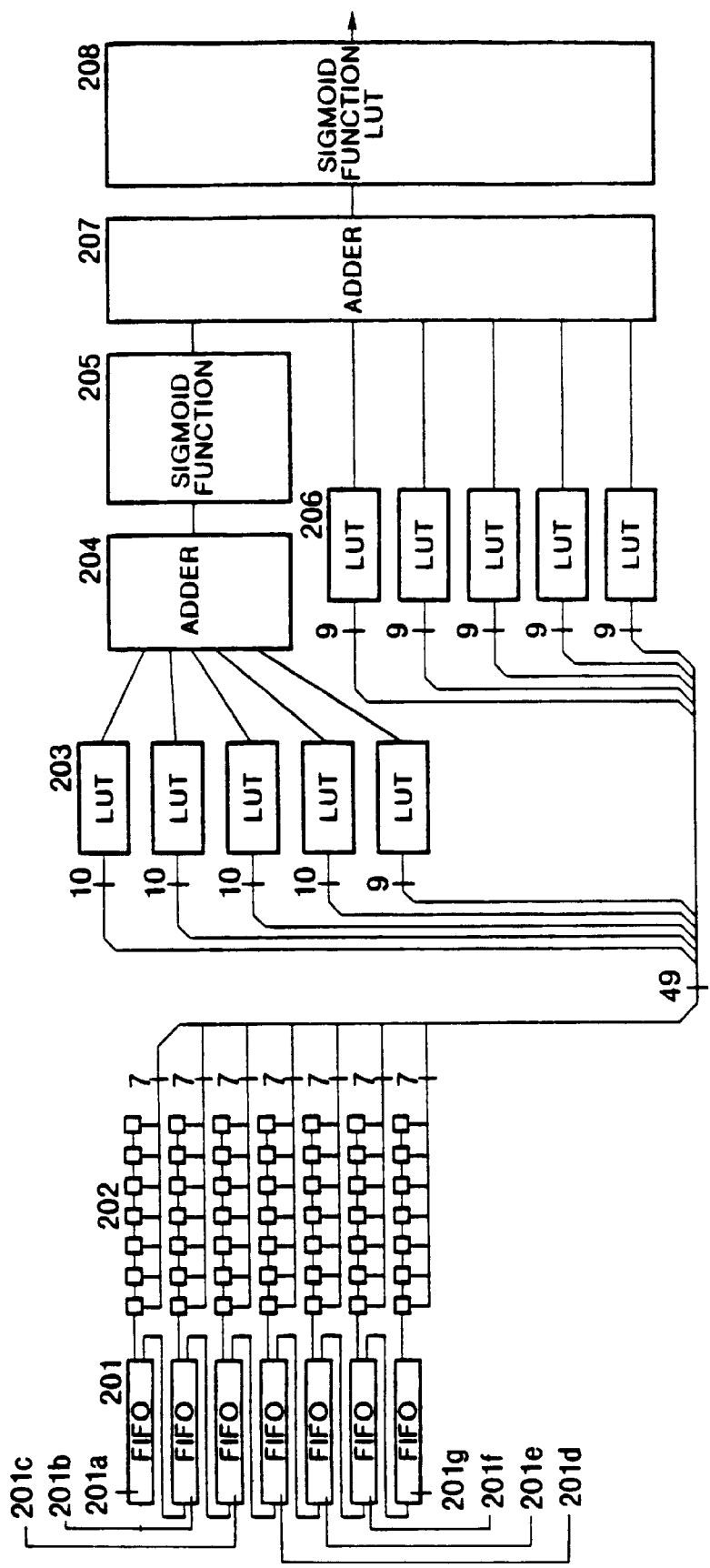
FIG. 2 is a block diagram showing the hardware arrangement of an image processing apparatus according to one embodiment of the present invention.

Therefore, the neural network shown in FIG. 1 is realized by a hardware arrangement shown in FIG. 2.

Referring to FIG. 2, a buffer 201 is constituted by FIFO memories 201a to 201g, which receive image data read from an original image by an image input device (not shown). The FIFO memories 201a to 201g store data for seven consecutive lines, in the vertical direction, of an image, and sequentially output data from the left end to the right end at horizontal positions of the seven lines.

Hence, data in a 7×7 area in the horizontal and vertical directions are latched by data latches 202. 49 data latched by the data latches 202 are divided into bundles of 10, 10, 10, 10, and 9 data, which are respectively input to five look-up tables 203.

The five outputs from the look-up tables 203 are added to each other by an adder 204. The sum data is input to a sigmoid function look-up table 205, which outputs data converted using the sigmoid function.

Of the 49 data output from the latches 202, data corresponding to picture elements in the small area 1a are input to a look-up table 206a of a look-up table unit 206.

Similarly, data corresponding to picture elements in the small areas 1b to 1e are respectively input to look-up tables 206b to 206e.

The output from the look-up table 205 and the five outputs from the look-up table unit 206 are added to each other by an adder 207. The sum data is input to a final sigmoid function look-up table 208, which outputs multi-value data.

(Another Embodiment)

In the above embodiment, the size of an input data area is not limited to 7×7 but may be 5×5. With this change, the number of look-up tables 203 shown in FIG. 2 is decreased to three corresponding to bundles of 10, 10, and 5 data, and the load on the adder 204 can be reduced. Of course, the input data area is not limited to a rectangular area, and need not have an interesting picture element as the center. Also, the shape of the small area is not limited to a specific one, and the number of areas is not particularly limited.

Figure 6:
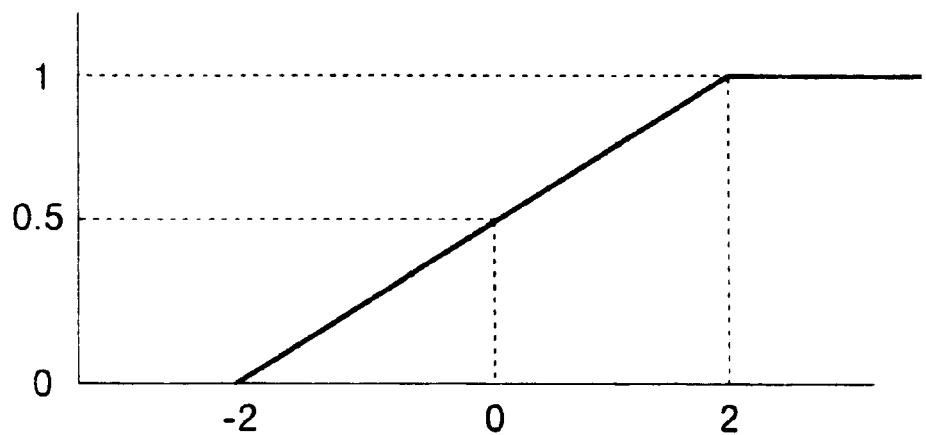
FIG. 6 is a chart showing an example of a function that approximates a sigmoid function.

In the above-mentioned embodiment, the sigmoid function is used. Alternatively, a threshold function may be used, or any other functions such as a function obtained by approximating a sigmoid function, as shown in FIG. 6, may be used. The number of intermediate layers and the number of neurons included in each intermediate layer are not particularly limited.

Image processing that can use the present invention is not limited to the above-mentioned conversion from a binary image into a multi-value image. For example, the arrangement of the present invention can be applied to various other image processing operations such as area discrimination, edge emphasis, blur correction, and the like. In the broader sense, the grouped network is not limited to the image processing but may be applied to various other fields.

The present invention described above may be applied to either a system constituted by a plurality of computers or a specific computer in the system.

Although the present invention has been described in its preferred form with a certain degree of particularity, many apparently widely different embodiments of the invention can be made without departing from the spirit and scope thereof. It is to be understood that the invention is not limited to the specific embodiments thereof except as defined in the appended claims.

What is claimed is:

1. An image processing apparatus including a neural network, said neural network comprising:

an input layer having first neurons for receiving pixel information in an area including a plurality of partial areas each of which contains a pixel of interest in an image;

an intermediate layer having a second neuron and a plurality of groups of third neurons, the second neuron being connected to all the first neurons and each respective group of the third neurons being connected to a respective group of first neurons, which corresponds to one of the plurality of partial areas; and an output layer having a fourth neuron which is connected to the second neuron and all groups of the third neurons and which outputs information corresponding to the pixel of interest.

2. An apparatus according to claim 1, wherein the information input to said input layer is binary pixel information, and the information output from said output layer is multi-value information of the the pixel of interest.

3. An apparatus according to claim 1, wherein said neural network is constituted by a plurality of look-up tables each comprising a ROM and an adder for adding outputs from some of said plurality of look-up tables.

4. An apparatus according to claim 1, wherein a union of all the partial areas is equal to the whole of the area.

* * * * *